UNITED STATES PATENT OFFICE.

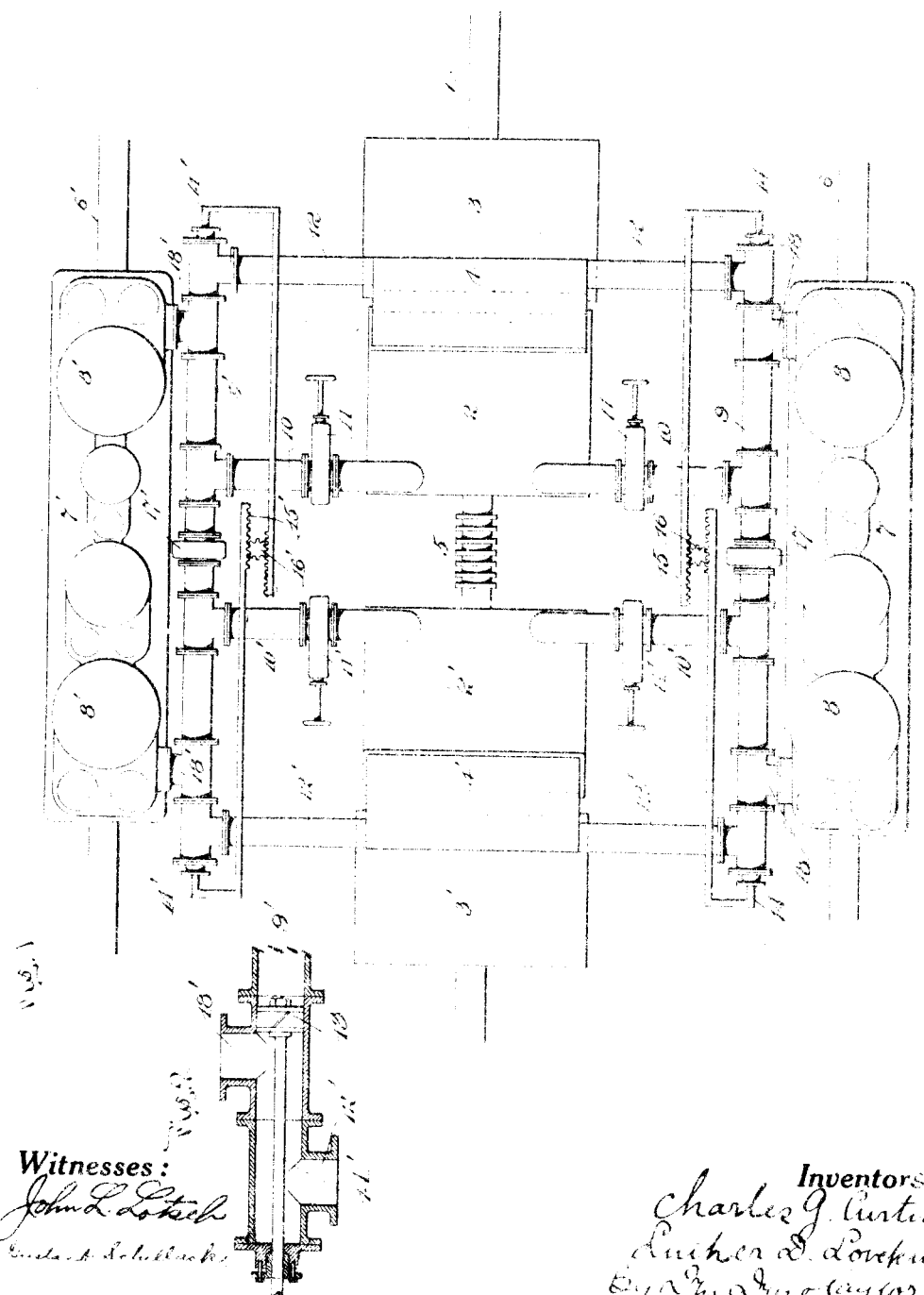

CHARLES G. CURTIS, OF NEW YORK, N. Y., AND LUTHER D. LOVEKIN, OF PHILADELPHIA, PENNSYLVANIA.

ELASTIC-FLUID TURBINE.

1,106,497.    Specification of Letters Patent.    Patented Aug. 11, 1914.

Application filed December 15, 1911. Serial No. 665,913.

*To all whom it may concern:*

Be it known that we, CHARLES G. CURTIS, a citizen of the United States, residing in the borough of Manhattan, in the city, county, and State of New York, and LUTHER D. LOVEKIN, a citizen of the United States, residing at Overbrook, in the city of Philadelphia, State of Pennsylvania, have invented a certain new and useful Improvement in Elastic-Fluid Turbines, of which the following is a specification.

This invention relates to elastic fluid turbines, especially steam turbines, for use under varying loads and speed.

The invention is more particularly intended for use in marine installations, particularly in war-ships.

The object of the invention is to produce a combination which will give a very high steam economy and which will do this over all ranges of speed.

These and further objects will more fully appear in the following specification and accompanying drawings, considered together or separately.

In the drawings, Figure 1 is a plan view, more or less diagrammatic, of an installation embodying our invention, and Fig. 2 is a detail of the steam passages and a valve. In both of the views, like parts are indicated by the same reference characters.

Referring to the drawings, 1 is the center shaft. On this shaft we arrange two turbines 2 and 2', and we provide each of these turbines with a condenser 3 and 3', these condensers being each connected to its adjacent turbine by means of a passage 4. Between the two turbines is a thrust-block 5, if such is necessary. On each side of the center shaft 1, is a wing shaft 6, 6'. Driving each wing shaft is a steam prime mover for which purpose we prefer a reciprocating engine 7, 7'. The exhaust pipes of low pressure cylinders 8, 8' of each of the reciprocating engines, are connected to a manifold 9, this manifold being connected to both low pressure cylinders 8, 8' of the engine, through the pipes 18, 18'. From each of the manifolds are pipes 10, 10' connected to the two turbines, serving as an independent connection to the individual turbines. The manifolds are also connected to the condensers by means of the pipes 12, 12'. The connections are so arranged that the exhaust from each of the reciprocating engines can enter the turbines through the manifold and the pipes 10 in multiple. In addition, by means of a valve 13, the manifold may be closed in relation to its communication with the passage to the turbines, and opened in connection with the pipes 12 of the condenser, so that the exhaust from the engines may pass directly to the condensers. This valve 13 (illustrated in Fig. 2) is adapted to slide in the manifold so as to open the passage from the pipe 18 to the pipe 10, closing it from the pipe 18 to the pipe 12. When the valve is moved in the other direction, it will close the passage from the pipe 18 to the pipe 12 and open it from the pipe 18 to the pipe 10.

The valve 13 is operated by a rod 14. Means is provided for simultaneously operating the valves 13, 13' at each end of the manifold. This means may conveniently consist, as shown, of racks 15 connected to the rod 14 and a pinion 16 engaging with both racks. In addition, a valve 17 may be arranged in the center of the manifold between the two pipes 10 and 10'.

According to this invention, when running at full loads and high speed the several valves 13 will be so positioned that the exhaust from the two low pressure cylinders 8, 8', will pass through the passages 18, 18' into the manifold, and from thence will be distributed to the two turbines 2 and 2'. The same arrangement is made with the steam connections of both reciprocating engines. When running under reduced loads and low speeds, the valves 13 will be in the same position, but one of the valves 11 or 11' will be closed so that the exhaust from the reciprocating engines will be entirely utilized in one of the turbines. When maneuvering or going astern, the valves 13 will be so positioned that the reciprocating engines will exhaust directly into the condensers. Either or both of the reciprocating engines may then be run astern.

It will be apparent from the foregoing description that at high speeds, with two turbines, there is a large steam passage to take care of the full volume steam, and that at low speeds and powers only one of the turbines being utilized, we thereby reduce the area of steam passage so as to better adapt it to the volume of steam corresponding to the light load. According to this construction it is apparent that no reversing turbine is required, and as the turbines will utilize effectively all of the discharge from the reciprocating engines, the efficiency of the turbines will be relatively high at all loads. In some conditions it may be necessary to close the valve 17 in order to get an equal distribution of steam into the two turbines.

Another great advantage of our arrangement is that by making the turbines in two units, they can be made of small diameter, so that it becomes practicable to place them between the two reciprocating engines and at the same time the condensers can be made in two or more units, each one separately connected to the turbine, so that the condensers can be kept down to a reasonable size, and in the event of damage to one, the other one can be operated independently.

Our arrangement also permits simple and direct steam connections, the pipes being short without many turns.

In accordance with the provisions of the patent statutes, we have described the principle of our invention, together with the apparatus which we now consider to represent the best embodiment thereof; but we desire to have it understood that the apparatus shown is merely illustrative and that the invention may be carried out in other ways.

Having now described our invention, what we claim as new and desire to secure by Letters Patent, is:—

1. The combination with a plurality of turbines on a shaft, and a prime mover on a separate shaft, a condenser, connections from the prime mover to the turbines, connections from the prime mover to the condenser, and means for shutting off the connections to one of the turbines and opening the connections to the condenser.

2. The combination with a plurality of turbines on a center shaft, of a prime mover on a separate shaft, at each side of the center shaft, means for passing working fluid through the prime movers, and from their discharge to the turbines in multiple at full loads, and means for cutting out one of the turbines at low loads.

3. The combination with a plurality of turbines on a center shaft, of a prime mover on a separate shaft, at each side of the center shaft, a condenser, connections from the prime movers to the turbines, connections from the prime movers to the condenser, and means for shutting off the connections to the turbines, and opening the connections to the condenser.

This specification signed and witnessed this 13th day of December, 1911.

CHARLES G. CURTIS.
LUTHER D. LOVEKIN.

Witnesses:
JOHN L. LOTSCH,
GUSTAV A. SCHELLACK.